United States Patent [19]

Reuter et al.

[11] Patent Number: 4,697,793
[45] Date of Patent: Oct. 6, 1987

[54] HYDRAULICALLY DAMPED ELASTIC ENGINE MOUNT

[75] Inventors: Horst Reuter, Wachtberg-Oberbachem; Jörn-Rainer Quast, Sinzig-Bad Bodendorf; Peter Maier, Wachtberg-Fritzdorf; Heinrich Brenner, Bad Neuenahr-Ahrweiler, all of Fed. Rep. of Germany

[73] Assignee: BOGE GmbH, Eitorf, Fed. Rep. of Germany

[21] Appl. No.: 821,173

[22] Filed: Jan. 21, 1986

Related U.S. Application Data

[63] Continuation-in-part of Ser. No. 730,770, May 3, 1985, Pat. No. 4,645,189, Ser. No. 561,173, Dec. 14, 1983, abandoned, and Ser. No. 562,232, Dec. 16, 1983, abandoned.

[30] Foreign Application Priority Data

Jan. 19, 1985 [DE] Fed. Rep. of Germany ....... 3501628

[51] Int. Cl.$^4$ ...................... B60G 15/04; F16M 5/00; F16M 13/00
[52] U.S. Cl. .................................... 267/195; 248/562; 267/140.1
[58] Field of Search ............... 267/8 R, 35, 63 R, 136, 267/140.1, 140.4, 141, 141.2, 141.4; 188/268, 298; 180/300; 248/559, 562, 636

[56] References Cited

U.S. PATENT DOCUMENTS 4,159,091 6/1979 Le Salver ..................... 267/140.1 X
4,437,653 3/1984 Kakimoto .......................... 267/140.1
4,572,490 2/1986 Alciati .............................. 267/140.1

FOREIGN PATENT DOCUMENTS 0098331 1/1984 European Pat. Off. ......... 267/140.1
3246587 6/1984 Fed. Rep. of Germany .
3246205 6/1984 Fed. Rep. of Germany .
3416431 11/1985 Fed. Rep. of Germany .
0231237 12/1984 Japan ................................. 267/8 R

OTHER PUBLICATIONS

"Theory of Rubber Mountings with hydraulic Damping", *Automobiltechnische Zeitschrift*, vol. 87, Issue 10, (1985).

*Primary Examiner*—Andres Kashnikow
*Assistant Examiner*—Robert J. Oberleitner
*Attorney, Agent, or Firm*—Nils H. Ljungman

[57] ABSTRACT

Hydraulic damping single-chamber mounting for motor vehicles with two rigid end walls axially disposed opposite one another, and at least two chambers containing damping fluid disposed axially behind one another. In a first of the two chambers, the damping fluid can be both compressed and decompressed. A rigid partition separates the two chambers. The partition is fixed and rigidly clamped on its outside circumference. The chambers are in communication with one another by means of a circular channel running around a central axis of the rigid partition. The rigid partition is located radially inside an elastic, axially-movable membrane. The membrane is fixed and rigidly clamped on its outside circumference. The rigid partition has at least one overpressure valve which operates for each direction of positive pressure between the chambers to prevent noises during cavitation in the decompression phase and pressure peaks in the compression phase within the first chamber.

16 Claims, 11 Drawing Figures

HYDRAULICALLY DAMPED ELASTIC ENGINE MOUNT

CROSS REFERENCE TO CO-PENDING APPLICATIONS

This application is a continuation in part of the following applications:

Co-pending application Ser. No. 06/730,770, filed on May 3, 1985, now U.S. Pat. No. 4,645,189 entitled "Hydraulic Damping Rubber Engine Mounts", corresponding to Federal Republic of Germany Patent Application No. P 34 16 431.6-12, filed on May 4, 1984; co-pending application Ser. No. 06/561,173, filed on Dec. 14, 1983, now abandon, entitled "Rubber Mounting with Hydraulic Damping, Particularly for Mounting Vehicle Engines", corresponding to Federal Republic of Germany Patent Application No. P 32 46 205.0-12, filed on Dec. 14, 1982; and co-pending application Ser. No. 06/562,232, filed on Dec. 16, 1983, now abandon, entitled "Rubber Mounting with Hydraulic Damping", corresponding to Federal Republic of Germany Patent Application No. P 32 46 587.4-12, filed on Dec. 16, 1982, are all assigned to the same assignee as the instant application and are incorporated herein by reference as if the texts thereof were fully set forth herein.

BACKGROUND OF THE INVENTION

1. Field of the Invention

The invention relates generally to hydraulically damped mounts and, more particularly, to hydraulically damped elastic mounts for motor vehicles.

2. Description of the Prior Art

Such elastic mountings are used to provide support for engines in motor vehicles of all types. For the support of internal combustion motors in motor vehicles, it is necessary to provide, on the one hand, the softest possible mounting with a low self-damping characteristic to prevent the transmission of noise. These mountings allow the motor movements excited by the roadway to become very large and potentially excessive and then slowly to almost die out. These large motor movements, on the other hand, can be reduced by hard bearings or separate vibration dampers, but that solution results in significant transmission of noise to the body of the vehicle.

Elastic mounts of the general type of the present invention are known, for example, in German Laid Open Patent Application No. DE-OS 32 46 587, which have good damping in the low frequency range. A disadvantage, however, is that above a certain amplitude of vibration or a certain frequency in the decompression phase, cavitation occurs in the chamber, which leads to an undesirable production of noise. Such cavitation always occurs when, with large amplitudes, the damping fluid flows from the one chamber into the other chamber, and a vacuum is formed ahead of the throttle point, since the fluid equalization cannot take place rapidly enough. In the compression stage, on the other hand, undesirable noise is also caused, when large amplitudes occur, by the damping fluid again not flowing quickly enough from the one chamber into the other chamber, because of inertia action of the fluid. The throttle then is essentially blocked, and because of the excessive pressure increase, noises again occur, since the pressure peaks which occur at large amplitudes cannot easily be reduced.

Cavitation of a liquid results when the pressure in a point in the liquid decreases to a value which is below the vapor pressure of the fluid. When the vapor pressure of a fluid is greater than the pressure at a point therein, the fluid changes from the fluid phase, that is, liquid phase, into the vapor phase.

This change of phase is akin to boiling. The vapor will be produced during cavitation as long as the pressure within the fluid is below that of its vapor pressure. Of course, the vapor pressure of fluids within hydraulic damping equipment causes cavitation at pressures well below atmospheric pressure, that is, the fluids boil at operating temperatures.

In the newer and smaller motors, which are generally of four-cylinder design, the vibrations in the motor are at substantially half the frequency of the vibrations of an eight-cylinder motor running at the same number of revolutions per minute. Therefore, the frequency of excitation of the motor is at generally lower frequencies than in corresponding six- and eight-cylinder motors. Furthermore, low frequency vibrations especially during start-up and shut-down of the engine are more prevalent because of the inherent nature of the lower frequencies of vibration due to the smaller number of piston explosions, etc. Additionally, the relative weight of the pistons to the entire engine in a four-cylinder motor are generally greater than in a larger motor. A four-cylinder motor generates greater amplitudes of vibration. Since these greater amplitudes of vibration are at a lower frequency, as is well known in the vibration theory, these lower frequency vibrations will have greater amplitudes than similar higher frequency vibrations of similar energy, because the low pass characteristics of a smaller engine are not as highly filtered as those of a larger engine. Therefore, in smaller engines which are lighter in weight and do not damp out the frequencies of oscillation the same way that larger motors with a greater number of cylinders do, the danger of cavitation in the engine mounts is greater. Because of the problems which have developed in the trend towards lighter, smaller cars with correspondingly lighter, smaller motors with less cylinders, there has been a growing need for refinement of the engine mounts.

OBJECT OF THE INVENTION

The object of the invention is the creation of a simple and effective elastic bearing, which prevents the undesirable noises in the low-frequency range with large amplitudes caused by motor excitations, the roadway, or during engine start-up and shutdown, which arise as a result of cavitation phenomena in the decompression phase and as a result of pressure peaks in the compression phase, and with which an optimum isolation of the transmission of noise from the motor to the body in the high frequency range with low amplitudes is not adversely affected.

SUMMARY OF THE INVENTION

The invention achieves this object as a result of the fact that the partition between the chambers has at least one hole therein, in which there is at least one valve for the decompression and compression phase.

An advantage of this embodiment is that in the normal operating range of the mounting, there is no effect on the functions of noise isolation and damping, but with large amplitudes, during which cavitation occurs in the decompression phase and pressure peaks in the compression phase, a fluid exchange is achieved as a bypass to the damping duct. Such situations often occur in the start-up and shutdown phase of a motor, as well as when severe excitations are caused by the roughness of the road. The underpressure in the chamber which arises as a result of cavitation in the decompression phase is equalized by a decompression phase valve, while pressure peaks in the compression phase in the reverse direction can be equalized by means of a compression phase valve.

In one advantageous embodiment of the invention, there is a joint valve for the decompression and compression phase. The valve is advantageously prestressed by a spring. By using springloaded valves and by selecting appropriate springs, it is possible to achieve a valve setting at which the bypass is opened once a certain pressure is exceeded.

Another important characteristic of the invention is that the valve is located in a plate which is fixed and tightly braced on its external circumference. Such a plate, together with the corresponding valve, can be produced as a unit and easily located in one area of the rigid partition.

In one particularly advantageous embodiment, the plate is designed to be elastic and the valve includes a penetration of the plate. In this configuration, it is advantageous that above a certain limit pressure, the slots open, both in the compression direction and in the decompression direction. After opening of the bypass valve, the pressure equalization takes place, so that then the valve again closes independently. The occurrence of extreme overpressures and extreme underpressures is thereby prevented, as is any undesirable noise production.

To achieve a particularly soft transition, the invention provides that the elastic plate exhibit, in cross section, at least one concave side. The preferred surface, however, is one in which both sides are concave, so that the elastic plate exhibits a taper starting at the braced edge.

To assure the most rapid pressure equalization possible, one embodiment of the invention provides that the elastic plate exhibit, in cross section, at lest one convex surface. As a result of the spherical design, the valve opens very late, but still all at once.

BRIEF DESCRIPTION OF THE DRAWINGS

Preferred embodiments of the invention are explained in greater detail in the drawings, in which.

DESCRIPTION OF THE PREFERRED EMBODIMENTS

Figure 1:
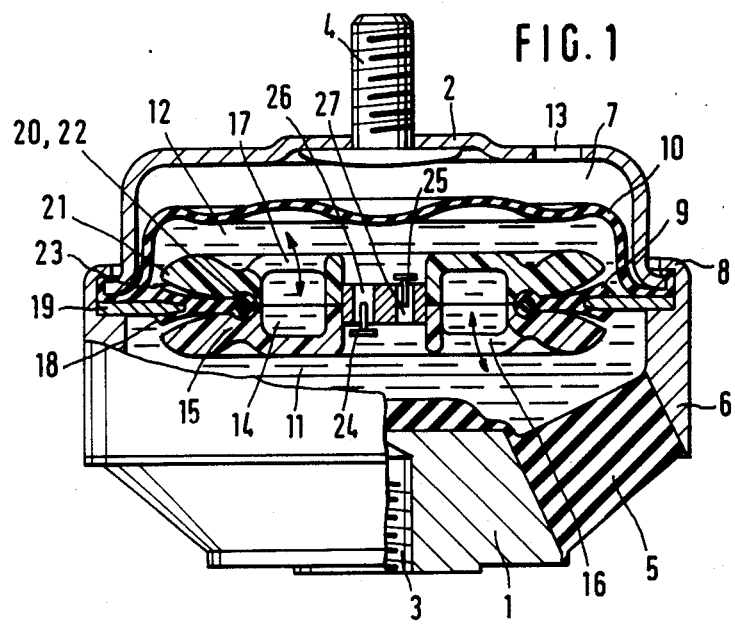
FIG. 1 shows an axial longitudinal section of a motor mount with a compression and decompression valve.

The motor mount illustrated in FIG. 1 has two end walls 1 and 2 axially opposite one another. The end wall 1, as a fastening, may either be equipped with a threaded hole 3 or with a threaded pin (not shown). The end wall 2, designed as a cover plate, preferably has a corresponding fastening pin 4.

Vulcanized onto the conical jacket surface of the end wall 1, there is a circumferential wall designed as an elastic spring element 5. In its connecting surface facing away from the end wall 1, this circumferential wall 5 is joined to a connecting flange 6. The connecting flange 6 also includes a rim 8, which houses a membrane 18, a bellows 10 and the end wall 2, designed as a cover plate. The motor mount therefore has two chambers 11 and 12, which contain damping fluid and which are separated from one another by the membrane 18 and a rigid partition 15. The chamber 11 is designed as a compression chamber and the chamber 12 as an unpressurized equalization chamber. In the end wall 2 there is an evacuation opening 13, which permits flow of air to and from a chamber 7, located between the end wall 2 and the bellows 10.

The membrane 18 is designed so that it can execute axial movements together with the rigid partition 15 during operation of the mounting, whereby the possible smooth axial movements of the membrane 18 correspond to the relatively low amplitudes of the high-frequency noise vibrations, among other excitations, which are acting on the mounting. These vibrations are thereby uncoupled from the mounting, so that the result is a good noise isolation.

The rigid partition 15 contains, in a radial plane passing therethrough, a continuous channel 14 which runs in a circular fashion around a central axis of the mounting. This channel 14 connects the two chambers 11 and 12 with one another. The circular channel 14 has a length and cross section surface so that the resonance frequency of the fluid mass which is displaced into the annular channel 14 during the damping operation, in combination with the elasticities of the elastic spring element 5 and of the flexible membrane 18, essentially corresponds to the resonance frequency of the vehicle motor on its suspension, and thereby assists in damping these frequencies out.

The membrane 18, which is rigidly braced on its outer circumference, is connected at its bracing point 20 with the rigid partition 15. In the rigid partition 15, there is the annular channel 14, whereby the entrance and exit openings 16 and 17 each empty into one end surface of the partition 15. The outside circumference of the membrane 18 is connected in a sealed manner with a clamping ring 19. The clamping ring 19, for its part, is clamped between the chambers 11 and 12 together with the bellows 10 and the cover plate 2 in the rim 8.

At the point of connection between the membrane 18 and the clamping ring 19, the membrane 18 grasps two end surfaces of the clamping ring 19, forming axial bulges 9. On the other side, the rigid partition 15, on its outer circumference, exhibits bilateral limit surfaces 23 in relation to the bulges 9 of the membrane 18. This produces an elastic limitation of the possible axial movements of the partition 15. The contour of the membrane, in combination with the travel limiting surfaces 23, produces a smooth transition between the uncoupling and damping range, while avoiding impact noises when damping begins.

The partition 15 is radially divided in the center and on its circumference exhibits, at the clamping point 20, an inside expansion for a form-closed connection with the membrane 18. If necessary, the membrane 18 can be equipped with a rigid internal reinforcement ring 22 in the vicinity of the clamping point 20. The external circumference of the partition 15 has stops 21, which, when an axial excursion occurs, come into contact with the bulges 9 of the membrane 18.

In the central area of the partition 15, there are holes 26 and 27 to hold valves 24 and 25 respectively. The valve 24 operates when there is an extreme underpressure, and the valve 25 when pressure peaks occur during the compression phase.

Figure 2:
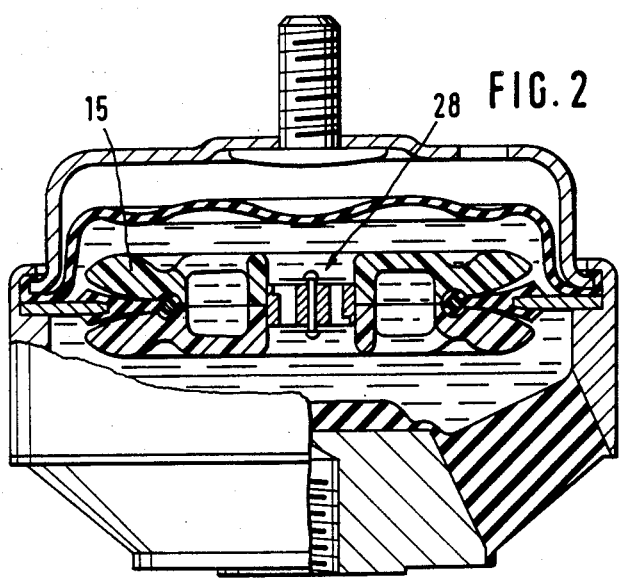
FIG. 2 shows an axial longitudinal section of a motor mount with a single valve which works in the decompression and compression phase.
Figure 3:
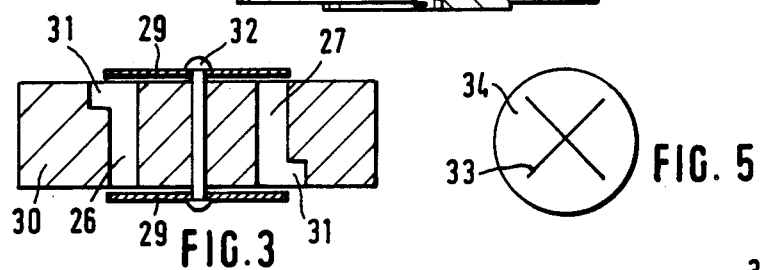
FIG. 3 shows the valve illustrated in FIG. 2, but on a larger scale.

On the motor mount illustrated in FIG. 2, most of the features are the same as on the mounting illustrated in FIG. 1. In the central region of the partition 15, however, there is a common valve 28 for the decompression and compression phase. The valve 28 shown is illustrated on a larger scale in FIG. 3, and again comprises holes 26 and 27. These holes 26 and 27, which are in the plate 30, are covered by the spring 29. The spring 29 in this embodiment is designed as a spring washer. The hole 26 which works in the decompression phase and the hole 27 which works in the compression phase are each provided with a recess 31, which assures operation in the corresponding direction of pressure. The springs 29 are connected with the plate 30 by means of a bolt or rivet connection 32.

Figure 4:
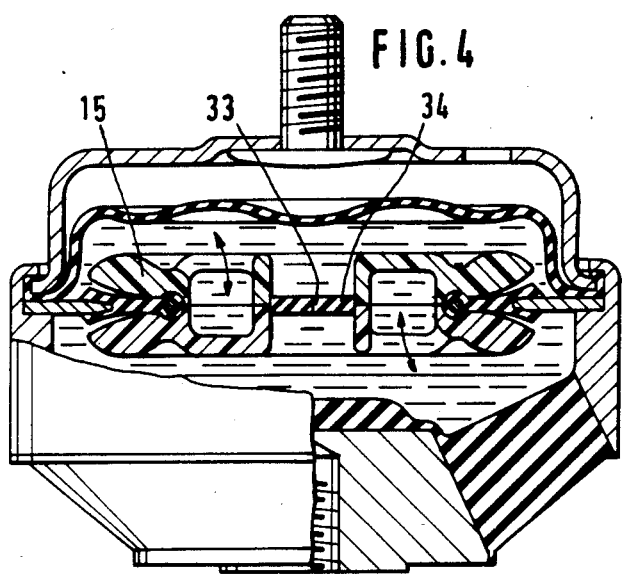
FIG. 4 shows a longitudinal section of a motor mount with an elastic plate designed as a valve.

FIG. 4 shows another embodiment of a motor mount, in which there is an elastic plate 34 in the central region of the rigid partition 15. This elastic plate 34 is equipped with a slot 33. This slot 33 thereby works in both directions of pressure as an overpressure valve. When a certain pressure is reached, the slot 33 opens on account of the elastic material of the plate 34.

Figure 5:
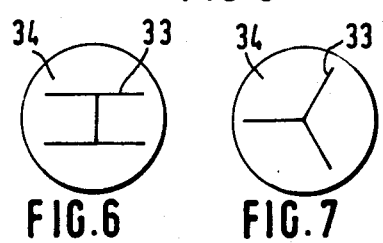
FIGS. 5 to 11 show individual embodiments of the elastic plate illustrated in FIG. 4 in an overhead view.
Figures 6, 7, 8, 9:
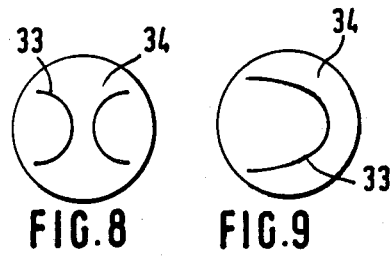

Individual embodiments of the elastic plate 34 are illustrated in FIGS. 5 to 9. FIG. 5 shows a slot 33, which was produced in the form of a cross-shaped cut. The slot 33 in FIG. 6 has an H-shaped cut. In FIG. 7, the slot 33 consists of three cuts running in a star shape toward the center, and FIG. 8 shows two semicircular cuts and FIG. 9 one semicircular or arc-shaped cut. All these slots 33 shown in FIGS. 5 to 9 act as a valve 28 common to both the compression and the decompression phase.

Figure 10:
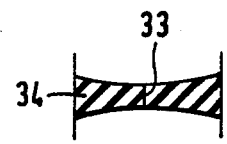

FIG. 10 shows an elastic plate 34, which in cross sections exhibits a concave shape on both surfaces. This hollow plate 34 assures a smooth transition when the pressure equalization begins, since the slot 33 opens slowly and smoothly.

Figure 11:
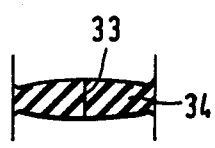

In contrast, FIG. 11 shows a spherical embodiment of the elastic plate 34. When a pressure equalization takes place, the convex shape makes possible an all-at-once opening of the split 33.

The invention as described hereinabove in the context of the preferred embodiments is not to be taken as limited to all of the provided details thereof, since modifications and variations thereof may be made without departing from the spirit and scope of the invention.

What is claimed is:

1. A resilient mounting device having hydraulic damping for vibrationally damping a motor vehicle engine, said mounting device having a longitudinal axis along which damping is prevalent, said mounting device having opposite first and second rigid end portions with mounting means thereat, said end portions being at either end of said longitudinal axis;

an elastic connecting element resiliently connecting said first and second end portions and forming with them a cavity for two chambers in controllable fluid communication, each with the other, said two chambers for containing damping fluid, and being disposed one adjacent the other along said longitudinal axis;

a first of said two chambers being a compression chamber defined in part by said first rigid end portion which is sealed for permitting a build-up of pressures substantially above and below ambient pressure about said mounting device;

a second of said two chambers being an unpressurized equalization chamber defined in part by a bellows means wherein said bellows means further defines in combination with the second rigid end portion, a third chamber, said second rigid end portion defining therein airflow evacuation openings for substantially equalizing pressure in said second of said two chambers with said ambient pressure about said mounting device;

said two chambers being separated by circular partition means, said partition means having a circular outer flexible peripheral portion and a circular rigid inner portion, said rigid inner portion being disposed within said outer peripheral portion of said partition means, said outer peripheral portion comprising a flexible suspension element for holding said rigid inner portion elastically suspended between and movable within said two chambers and damping a first type of pressure differences between said two chambers;

said rigid inner portion having a central axis, which is generally perpendicular to said longitudinal axis defined therethrough, and having a continuous channel connecting said first and said second chambers, said channel following a circular route having a predetermined length, being radially displaced from and about said central axis in said rigid inner portion;

said partition means having valve means which are normally biased in a closed position to keep said valve means closed when a pressure difference between said first chamber and said secod chamber is below a first predetermined pressure differential and to keep said valve means in a closed position when a pressure difference between said second chamber and said first chamber is below a first predetermined pressure differential, said valve means being disposed in said partition means and moving therewith for opening and relieving a pressure between said chambers in a range of pressures greater than said predetermined pressure differentials, thereby minimizing cavitation and pressure peaks substantially above said ambient pressure in said damping fluid in said first chamber.

2. The resilient mounting device according to claim 1, wherein said valve means comprises a single valve assembly being biased to open when said predetermined pressure differentials are exceeded during both decompression and compression of the fluid in said first chamber.

3. The resilient mounting device according to claim 2, wherein said valve means have biasing means for biasing said valve means closed when said predetermined pressure differentials are not exceeded.

4. The resilient mounting device according to claim 3, including a plate being firmly affixed to a central portion of said rigid inner portion and wherein said valve means is disposed in said plate.

5. The resilient mounting device according to claim 2, including a plate being firmly affixed to a central portion of said rigid inner portion and wherein said valve means is disposed in said plate.

6. The resilient mounting device according to claim 1, wherein said valve means comprises a plurality of valves, at least one of which is biased to open to relieve compression pressures and at least another of which is biased to open to relieve decompression pressures of the fluid in said first chamber.

7. The resilient mounting device according to claim 6, wherein said valve means have biasing means for biasing said valve means closed when said predetermined pressure differentials are not exceeded.

8. The resilient mounting device according to claim 6, including a plate being firmly affixed to a central portion of said rigid inner portion and wherein said valve means is disposed in said plate.

9. The resilient mounting device according to claim 7, including a plate being firmly affixed to a central portion of said rigid inner portion and wherein said valve means is disposed in said plate.

10. The resilient mounting device according to claim 1, including a plate being firmly affixed to a central portion of said rigid inner portion and wherein said valve means is disposed in said plate.

11. The resilient mounting device according to claim 10, wherein said plate comprises elastic material and said valve means comprises at least one split in said elastic plate.

12. The resilient mounting device according to claim 11, wherein said valve means comprises a plurality of splits in said elastic plate.

13. The resilient mounting device according to claim 12, wherein said elastic plate has at least one concave side disposed toward one of said two chambers.

14. The resilient mounting device according to claim 12, wherein said elastic plate has at least one convex surface disposed toward one of said two chambers.

15. The resilient mounting device according to claim 11, wherein said elastic plate has at least one concave side disposed toward one of said two chambers.

16. The resilient mounting device according to claim 11, wherein said elastic plate has at least one convex surface disposed toward one of said two chambers.

* * * * *